(12) United States Patent
Single

(10) Patent No.: US 8,923,805 B2
(45) Date of Patent: Dec. 30, 2014

(54) EMERGENCY RESCUE SYSTEM AND HELP-SEEKING DEVICE AND EMERGENCY RESCUE METHOD

(71) Applicants: Mitac International Corp., Taoyuan County (TW); Mitac Computer (Shun De) Ltd., Foshan (CN)

(72) Inventor: Meng Single, Foshan (CN)

(73) Assignees: Mitac International Corp., Kuei San Township, Taoyuan County (TW); Mitac Computer (Shun De) Ltd., Foshan City, Guangdong Province (CN)

(*) Notice: Subject to any disclaimer, the term of this patent is extended or adjusted under 35 U.S.C. 154(b) by 86 days.

(21) Appl. No.: 13/753,021

(22) Filed: Jan. 29, 2013

(65) Prior Publication Data
US 2013/0252574 A1 Sep. 26, 2013

(30) Foreign Application Priority Data
Mar. 23, 2012 (CN) .......................... 2012 1 0081686

(51) Int. Cl.
*H04M 11/04* (2006.01)
*H04W 24/00* (2009.01)
*H04W 4/22* (2009.01)

(52) U.S. Cl.
CPC ...................... *H04W 4/22* (2013.01)

USPC .................. 455/404.2; 455/404.1; 455/456.3; 455/457

(58) Field of Classification Search
None
See application file for complete search history.

(56) References Cited

U.S. PATENT DOCUMENTS

| | | | |
|---|---|---|---|
| 2005/0085257 A1* | 4/2005 | Laird et al. ................. | 455/550.1 |
| 2005/0239477 A1* | 10/2005 | Kim et al. .................. | 455/456.1 |
| 2009/0298461 A1* | 12/2009 | O'Reilly .................... | 455/404.2 |
| 2011/0319051 A1* | 12/2011 | Reitnour .................... | 455/404.2 |

* cited by examiner

*Primary Examiner* — Erika A Washington
(74) *Attorney, Agent, or Firm* — Muncy, Geissler, Olds & Lowe, P.C.

(57) ABSTRACT

An emergency rescue system and a handheld electronic device and an emergency rescue method are provided. The emergency rescue system comprises a help-seeking device, a rescue device and a server. The help-seeking device is used to position, and used to provide a help-seeker to input situation information to send a help-seeking message to the server. The rescue device is used to position and send a positioning message to the server. The sever is used to compare the help-seeking message and the positioning message to execute a supply-demand pairing, and used to send the help-seeking message and the positioning message to the help-seeking device and the rescue device respectively for making the help-seeking device can communicate with the rescue device.

20 Claims, 4 Drawing Sheets

EMERGENCY RESCUE SYSTEM AND HELP-SEEKING DEVICE AND EMERGENCY RESCUE METHOD

CROSS-REFERENCE TO RELATED APPLICATION

This application claims the benefit of China Patent Application No. 201210081686.2, filed on Mar. 23, 2012, in the State Intellectual Property Office of the People's Republic of China, the disclosure of which is incorporated herein in its entirety by reference.

BACKGROUND OF THE INVENTION

1. Field of the Invention

The present invention relates to an emergency rescue system and it help-seeking device and emergency rescue method, and more particularly to an emergency rescue system and a help-seeking device and emergency rescue method utilizing a GPS electronic device to provide a help-seeker to transmit help-seeking information at fast and various manner and capable of linking with a rescue side having a GPS functional device.

2. Description of the Related Art

Recently, global positioning systems (GPS) are so popular, especially for devices of satellite navigators or mobile phones applied in automobiles or motorcycles. Everyone has a mobile phone. Absolutely, for some people, the mobile phone must be carried at any time and is a necessary device in daily life. The satellite navigator is also a device that is frequently used while driving the automobile or riding the motorcycle.

The satellite navigator, the mobile phone having the GPS function or other electronic device having the GPS function has functions of mobile positioning and route navigation to allow the user can use related functions and services to quickly and correctly reach destinations. However, when the devices having the GPS function is used in a rescue mission, the mobile positioning is not enough. If a help-seeker has the electronic device having the GPS function in case of emergency, the device can merely position his/her orientation through mobile positioning to allow a rescuer to search the help-seeker based upon a positioned location and may not provide the help-seeker to directly communicate with the rescuer to notify self-condition and injury so that the rescuer is unable to provide real-time rescue. Moreover, a positioning signal sent by the GPS electronic device of the help-seeker is usually only transmitted to a specific unit such as a rescue team or a fire bureau and may not be transmitted to nearby GPS electronic devices directly. Consequently, the rescue service may not be on time. Upon the foregoing reasons, a system capable of analyzing, planning and distributing a help-seeking message and location information through a digital manner to effectively improve the rescue efficiency is required.

SUMMARY OF THE INVENTION

In view of the shortcomings of the prior art, the inventor(s) of the present invention based on years of experience in the related industry to conduct extensive researches and experiments, and finally developed an emergency rescue system and its help-seeking device and emergency rescue method as a principle objective to overcome problems of the difficulty to perform communication between a help-seeker and a rescuer through a GPS device in prior arts.

To achieve the foregoing objective of the invention, an emergency rescue system is provided and comprises a help-seeking device, a rescue device and a server. The help-seeking device includes first identification information and a GPS positioning function to position a current location to generate first current location information and is provided to a help-seeker to input situation information. The help-seeking device further packages first identification information, first current location information and situation information into a help-seeking message that is delivered. The rescue device has second identification information and a GPS positioning function to position a current location to generate second current location information and packages second identification information and second current location information into a positioning message that is delivered. The server receives the help-seeking message and the positioning message to determine whether or not first current location information corresponds to second current location information. If yes, a supply-demand pairing is performed to send the help-seeking message to the rescue device and to send the positioning message to the help-seeking device such that the help-seeking device and the rescue device that have been paired can communicate with each other through first identification information and second identification information.

Preferably, the help-seeking device includes a positioning module, an input module, a processing module and a transmission module. The positioning module positions the current location of the help-seeking device to generate first current location information. The input module is provided to a help-seeker to input situation information and also to input a script message for communicating with the rescue device that has been paired. The processing module is connected to the positioning module and the input module to package first identification information, first current location information and situation information into the help-seeking message. The transmission module is connected to the processing module to send the help-seeking message and the script message.

Preferably, the help-seeking device includes a positioning module, an input module, a processing module and a transmission module. The positioning module positions the help-seeking device to generate second current location information. The input module is provided to the supplier to input situation information and provided to the help-seeker to input a script message to communicate with the rescue device that has been paired. The processing module is connected to the positioning module and the input module to package second identification information, second current location information and supply information into a supply message. The transmission module is connected to the processing module to transmit the help-seeking message and the script message.

Preferably, the help-seeking device comprises a display module connected to the processing module to display second current location information of the rescue device.

Preferably, the help-seeking device further comprises an image capturing module connected to the processing module to respectively provide a user to capture images of an ambient condition or a self-condition, and wherein after packaging the images into the help-seeking message through the processing module, the help-seeking message is transmitted to the server through the transmission module.

Preferably, the help-seeking device further comprises a sensing module connected to the processing module to sense a temperature, humidity or a foregoing combination of an ambient condition around the help-seeking device, thereby generating a sensing signal, and the sensing signal is computed and processed to become ambient information through the processing module, and ambient information then is packaged into the help-seeking message that is sent to the server through the transmission module.

Preferably, the rescue device comprises a positioning module, an input module, a processing module, a transmission module and a display module, and the positioning module positions the rescue device to generate second current location information; and the input module is provided to a rescuer to input a script message communicating with the help-seeking device, and the processing module is connected to the positioning module and the input module to package second identification information and second current location information into the positioning message, and the transmission module is connected to the processing module to send the positioning message and the script message, and the display module is connected to the processing module to display first current location information and situation information of the help-seeking device.

Preferably, first identification information and second identification information comprise an internet protocol address, a media access control address, a physical address or a phone number.

Preferably, the help-seeking device and the rescue device respectively comprise a communication module to provide the help-seeking device and the rescue device which have been paired to perform audio or video communication.

Preferably, the server further stores the help-seeking message and the positioning message.

To achieve the objective of the invention, a help-seeking device is provided and has first identification information and is suitable for use in an emergency rescue system and includes a positioning module for positioning a current location of the help-seeking device to generate first current location information; an input module for providing a help-seeker to input situation information; a processing module connected to the positioning module and the input module to package first identification information, first current location information and situation information into a help-seeking message; and a transmission module, connected to the processing module, for sending the help-seeking message to a server to allow the server performing a supply-demand pairing such that the help-seeking message is sent to at least one rescue device close to the first current location information to allow the at least one rescue device to communicate with the help-seeking device through first identification information.

According to the objective of the invention, an emergency rescue method is further provided and includes the following steps: using a help-seeking device having first identification information and a GPS positioning function to position a current location to generate first current location information and providing a help-seeker to input situation information; packaging first identification information, first current location information and situation information into a help-seeking message through the help-seeking device and sending the help-seeking message; using a rescue device having second identification information and a GPS positioning function to position a current location to generate second current location information; packaging second identification information and second current location information into a positioning message through the rescue device and sending the positioning message; providing a server to receive the help-seeking message and the positioning message to determine whether or not first current location information corresponds to second current location information, if yes, performing a supply-demand pairing; and sending the help-seeking message to the rescue device through the server and sending the positioning message to the help-seeking device to allow the help-seeking device and the rescue device to communicate with each other through first identification information and second identification information The emergency rescue system and its help-seeking device and emergency rescue method according to the invention have one or more advantages as the following:

(1) The emergency rescue system and its help-seeking device and emergency rescue method according to the invention can allow the help-seeker to utilize the help-seeking device having the GPS function to send the help-seeking message such that the rescuer can obtain the condition of the help-seeker to provide optimum supports. The rescuer can utilize the help-seeking device communicating with the device having the GPS function to allow the rescuer to quickly complete the rescue mission.

(2) The emergency rescue system and its help-seeking device and emergency rescue method according to the invention can provide the help-seeker to utilize the help-seeking device having the GPS function to send the help-seeking message. The help-seeking message is not only sent to a specific unit but is also sent to the electronic devices having the GPS function within the same regional area to allow normal citizens passing by to obtain the help-seeking message and prevent the help-seeker from suffering further injury due to delayed rescue.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
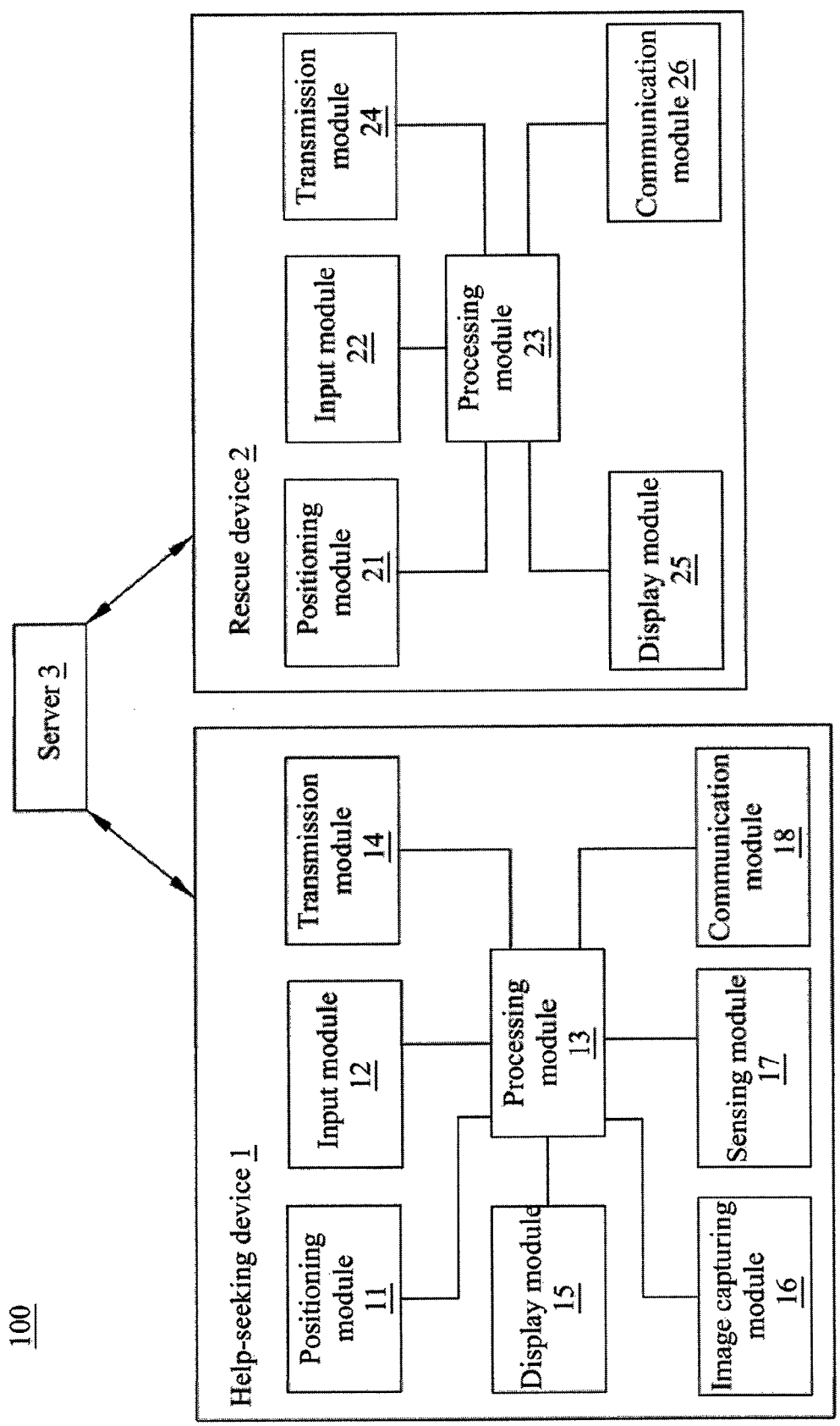
FIG. 1 a block diagram of an emergency rescue system and its help-seeking device according to the invention.

With reference to FIG. 1 for a block diagram of a supply-demand pairing system according to the invention is depicted. In the figure, the supply-demand pairing system 100 comprises a help-seeking device 1, a rescue device 2 and a server 3. The help-seeking device 1 and the rescue device 2 can be electronic devices such as a mobile phone having GPS positioning and navigation functions and a PDA. The help-seeking device 1 and the rescue device 2 respectively correspond to first identification information and second identification information. First identification information and second identification information can be an IP (internet protocol) address, a media access control (MAC) address, a physical address or a phone number for identifying the identifications of the help-seeking device 1 and the rescue device 2. The server 3 can be a remote host. The help-seeking device 1 and the rescue device 2 can be connected to the server 3 via Internet. The help-seeking device 1 comprises a positioning module 11, an input module 12, a processing module 13, a transmission module 14, a display module 15, an image capturing module 16, a sensing module 17 and a communication module 18. The processing module 13 is connected to the positioning module 11, the input module 12, the transmission module 14, the display module 15, the image capturing module 16, the sensing module 17 and the communication module 18. The rescue device 2 includes a positioning module 21, an input module 22, the processing module 23, the transmission module 24, a display module 25 and the communication module 26. The processing module 23 is connected to the positioning module 21, the input module 22, the transmission module 24, the display module 25 and the communication module 26. The input modules 12, 22 can be keypads. The display modules 15, 25 can be display screens. The input module 12 and the display module 15 and the input module 22 and the display module 25 can be integrated into a touch input panel respectively. The image capturing module 16 can be a lens, an image sensing component or a foregoing combination. The sensing module 17 can be a temperature sensor, a humidity sensor or an infrared sensor. The transmission modules 14, 24 can be a network interface for uploading data of scripts, figures or images to Internet. The communication modules 18, 26 can be a communication chip taken as audio or video communication.

The positioning module 11 of the help-seeking device 1 can position the current location of the help-seeking device to generate first current location information. The input module 12 can provide a help-seeker to input situation information, wherein situation information can include wounds of the help-seeker, number of people seeking help and current remaining goods and materials. The processing module 13 can package first identification information, first current location information and situation information into a help-seeking message. The transmission module 14 can deliver the help-seeking message to the server 3 through a network. The positioning module 21 of the rescue device 2 can perform positioning for the rescue device 2 to generate second current location information. The processing module 23 can package second identification information and second current location information into a positioning message. The transmission module 24 can send the positioning message to the server 3. When the server 3 receives the help-seeking message and the positioning message, the help-seeking message and the positioning message are stored and performed with a comparison task so that first current location information in the help-seeking message is compared with second current location information in the positioning message. If first current location information and second current location information are at the same location area, the server 3 executes a supply-demand pairing task to send the help-seeking message to the rescue device 2 and to send the positioning message to the help-seeking device 1 such that the help-seeking device 1 is connected to the rescue device 2 through second identification information, and the rescue device 2 is connected to the help-seeking device 1 through first identification information. Accordingly, the help-seeking device 1 is connected to the rescue device 2 to achieve communication.

When the help-seeking device 1 is connected to the rescue device 2, communication between the help-seeker and the rescuer can be achieved by inputting script messages or picture messages through the input modules 12, 22 respectively. These messages then are transmitted by the transmission modules 14, 24. Further, audio or video communication between the help-seeker and the rescuer can be performed by respectively utilizing the communication modules 18, 26 so as to perform talking. The help-seeker can observe second current location information of the rescue device 2 through the display module 15 to obtain the location of the rescuers.

The rescuer can search first current location information of the help-seeker device 1 through the display module 25 to further obtain orientation of the help-seeker. The display module 25 further displays situation information inputted by the help-seeker.

The help-seeker also utilizes the image capturing module 16 to perform image capturing. After taking ambient condition or self-image, the processing module 13 packages image information into the help-seeking message that then is transmitted to the server 3. The help-seeker can use the sensing module 17 to sense temperature and humidity of ambient condition or sense the body temperature to generate a sensing signal. Afterward the processing module 13 computes and processes the sensing signal to become ambient information and packages ambient information into the help-seeking message. The help-seeking message then is transmitted to the server 3 through the transmission module 14, wherein images captured by the help-seeker or ambient information obtained by the sensing module 17 is also displayed on the display modules 15, 25 respectively.

The help-seeker can also selectively send the help-seeking message to a specific rescue device 2. At this time, when the server 3 receives the help-seeking message and the positioning message, first identification information is compared with second identification information. If first identification information corresponds to second identification information, the server 3 performs supply-demand pairing.

Figure 2:
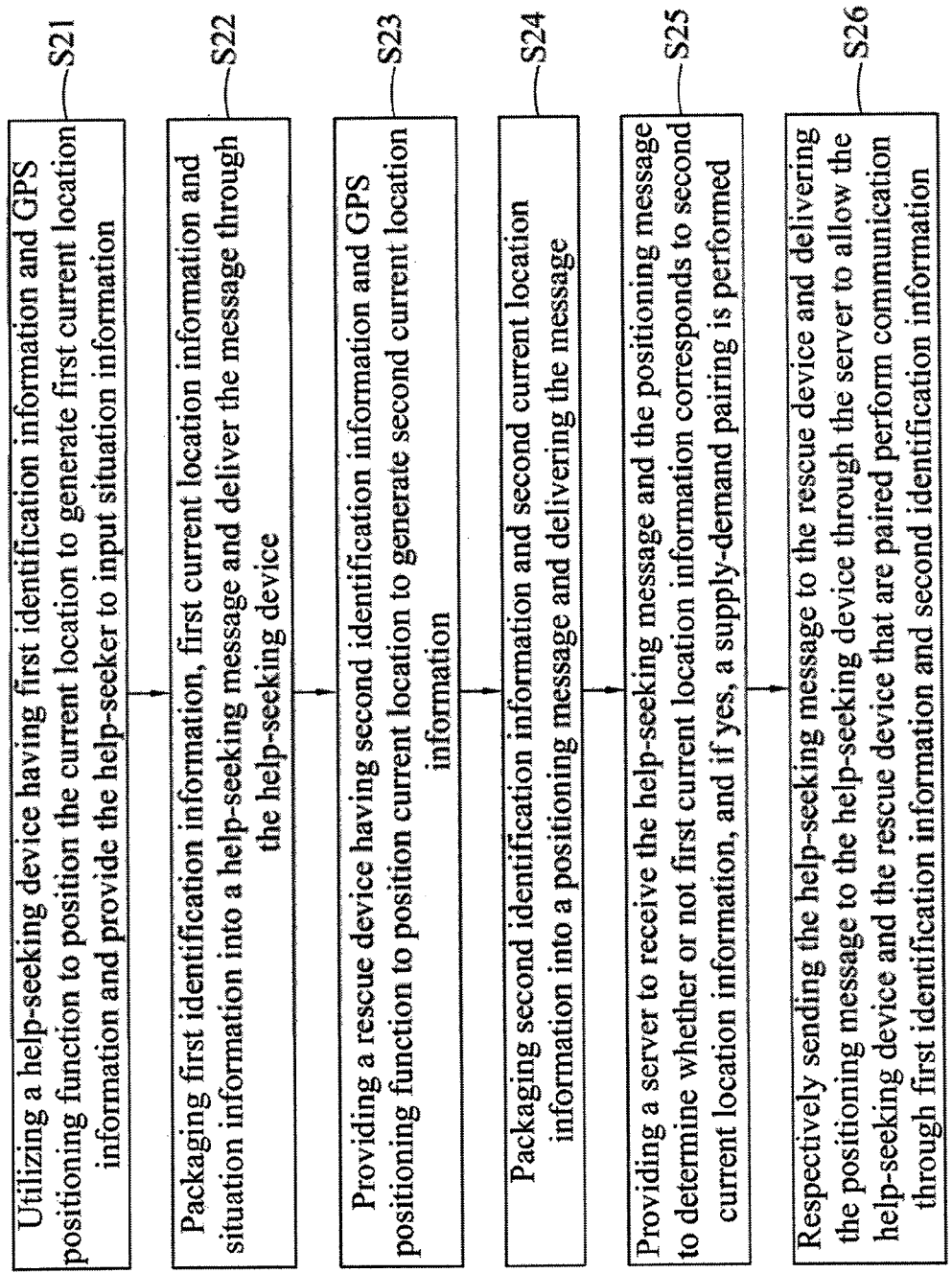
FIG. 2 is a flowchart of an emergency rescue method according to the invention.

With reference to FIG. 2 for a flowchart of an emergency rescue method according to the invention is depicted. The method comprises the following steps: S21: utilizing a help-seeking device having first identification information and GPS positioning function to position the current location to generate first current location information and provide the help-seeker to input situation information; S22: packaging first identification information, first current location information and situation information into a help-seeking message and deliver the message through the help-seeking device; S23: providing a rescue device having second identification information and GPS positioning function to position current location to generate second current location information; S24: packaging second identification information and second current location information into a positioning message and delivering the message; S25: providing a server to receive the help-seeking message and the positioning message to determine whether or not first current location information corresponds to second current location information, and if yes, a supply-demand pairing is performed; and S26: respectively sending the help-seeking message to the rescue device and delivering the positioning message to the help-seeking device through the server to allow the help-seeking device and the rescue device that are paired perform communication through first identification information and second identification information.

Figure 3A:
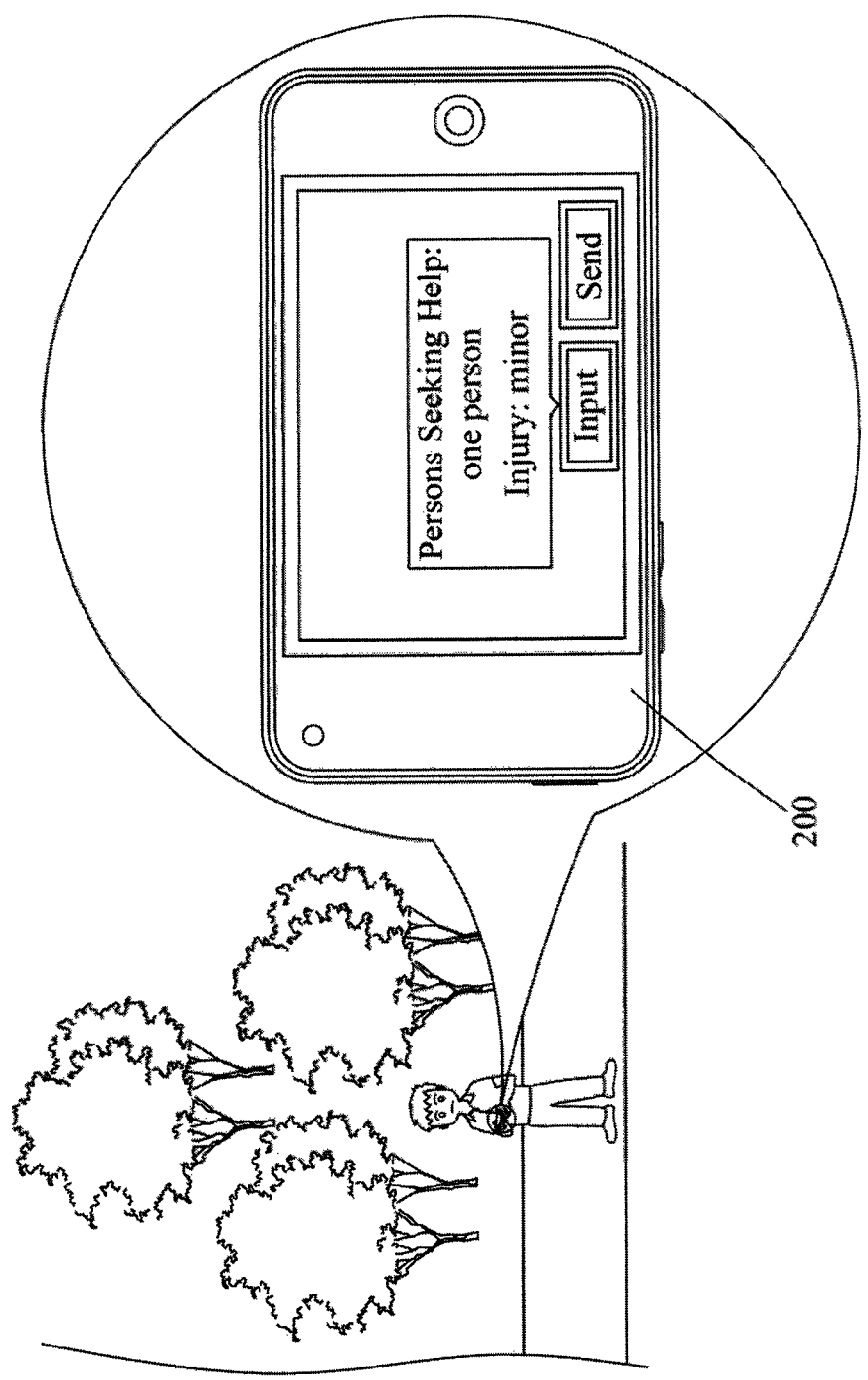
FIG. 3A is a first schematic diagram of an emergency rescue system and its help-seeking device and an emergency rescue method according to a first embodiment of the invention.
Figure 3B:
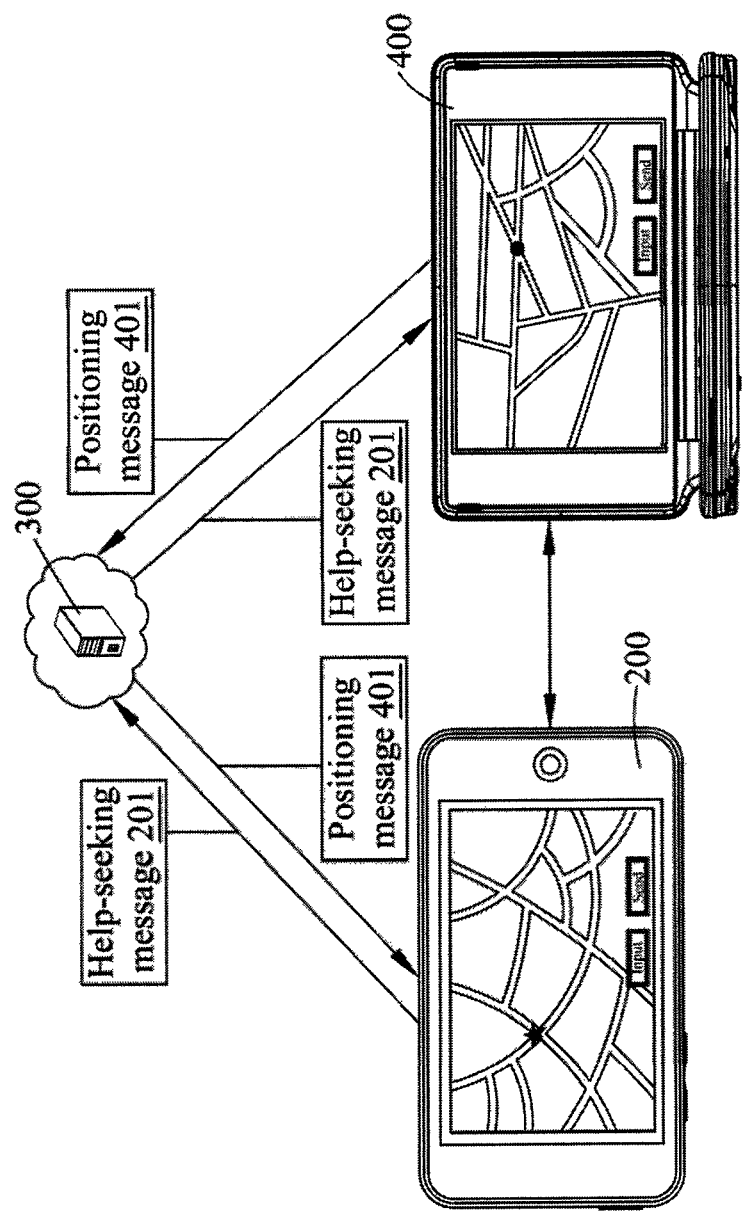
FIG. 3B is a second schematic diagram of an emergency rescue system and its help-seeking device and en emergency rescue method according to a second embodiment of the invention.

With reference to FIG. 3A and FIG. 3B for a first schematic diagram and a second schematic diagram of an emergency rescue system and its help-seeking device and emergency rescue method according to the embodiment of invention are depicted. In the embodiment, a help-seeker to be rescued can use the smart phone, the PDA or the tablet computer having GPS function to look for rescue. The help-seeker can firstly initiate the GPS function of the hand-held electronic device to perform positioning of the current location. Afterward the help-seeker can utilize input buttons to input situation information, such as the quantity of people, injured degree or remained food, as shown in FIG. 3A. Alternatively, the help-seeker can utilize the picture taking function of the hand-held electronic device 200 to capture ambient images or selfimages. In addition, the help-seeker can also turn on functions of sensing temperatures, humidity or infrared ray on the hand-held electronic device 200 to sense the exterior or self-temperature or humidity. Next, when the help-seeker presses the send button, the hand-held electronic device 200 packages the current location, situation information, image information, temperature/humidity sensing information or the foregoing combination into a help-seeking message 201 that is sent to a server 300 through networks. The server 300 also receives the positioning messages 401 uploaded by different GPS devices 400. At this time, the server 300 compares the help-seeking message 201 with many positioning messages 401. If the help-seeking message 201 corresponds to one of the positioning messages 401, the server 300 would execute a supply-demand pairing task to send the positioning message 401 to the hand-held electronic device 200 of the help-seeker, and the help-seeking message 201 is sent to the corresponding GPS device 400 so that the hand-held electronic device 200 is connected to the GPS device 400 to perform communication as shown in FIG. 3B. Accordingly, the help-seeker can be directly connected to a user taking the GPS device 400 through scripts, figures, images, audio or video manner to obtain rescue. The user having the GPS device can also obtain the orientation of the help-seeker and understand the condition of the help-seeker based upon the help-seeking message 201. The help-seeker can check the location of the user using the GPS device through a display screen of the hand-held electronic device 200. The hand-held electronic device 200 and the GPS device respectively have identification information such as the IP address, the MAC address, the physical address or the phone number. The hand-held electronic device 200 and the GPS device 400 simultaneously send identification while respectively uploading the help-seeking message 201 and the positioning message 401. The server 300 compares the current location of the help-seeking message 201 with identification information of the positioning message 401.

The emergency rescue system and its help-seeking device and emergency rescue method of the invention can provide communication between the help-seeker and the rescuer through the GPS positioning device, and the help-seeking message sent from the help-seeker is not necessarily sent to a specific rescue team only, and people passing by can also receive the help-seeking message to provide appropriate and instant supports for the help-seeker.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. An emergency rescue system comprising:
a help-seeking device having first identification information and a GPS (global positioning system) positioning function to position a current location to generate first current location information, and provided to a help-seeker to input situation information and for packaging first identification information, first current location information and situation information into a help-seeking message that is sent;
a rescue device having second identification information and a GPS positioning function to position a current location to generate second current location information, and for packaging second identification and second current location information into a positioning message that is transmitted; and
a server for receiving the help-seeking message and the positioning message to determine whether or not first current location information corresponds to second current location information, if yes, a supply-demand pairing being performed by the server to respectively send the help-seeking message and the positioning message to the rescue device and the help-seeking device, the help-seeking device being connected to the rescue device through first identification information and second identification for communicating with each other, and observing the second current location information for obtaining the current location of the rescue device.

2. The emergency rescue system as recited in claim 1, wherein the help-seeking device comprises a positioning module, an input module, a processing module and a transmission module, and the positioning module position the current location of the help-seeking device to generate first current location information; and the input module is provided to the help-seeker to input situation information and allows the help-seeker to input a script message communicating with the rescue device that is paired, and the processing module is connected to the positioning module and the input module to package first identification information, first current location information, and situation information into the help-seeking message, and the transmission module is connected to the processing module to send the help-seeking message and the script message.

3. The emergency rescue system as recited in claim 2, wherein the help-seeking device comprises a display module connected to the processing module to display second current location information of the rescue device.

4. The emergency rescue system as recited in claim 2, wherein the help-seeking device further comprises an image capturing module connected to the processing module to respectively provide a user to capture images of an ambient condition or a self-condition, and wherein after packaging the images into the help-seeking message through the processing module, the help-seeking message is transmitted to the server through the transmission module.

5. The emergency rescue system as recited in claim 2, wherein the help-seeking device further comprises a sensing module connected to the processing module to sense a temperature, humidity or a foregoing combination of an ambient condition around the help-seeking device, thereby generating a sensing signal, and the sensing signal is computed and processed to become ambient information through the processing module, and ambient information then is packaged into the help-seeking message that is sent to the server through the transmission module.

6. The emergency rescue system as recited in claim 1, wherein the rescue device comprises a positioning module, an input module, a processing module, a transmission module and a display module, and the positioning module positions the rescue device to generate second current location information; and the input module is provided to a rescuer to input a script message communicating with the help-seeking device, and the processing module is connected to the positioning module and the input module to package second identification information and second current location information into the positioning message, and the transmission module is connected to the processing module to send the positioning message and the script message, and the display module is connected to the processing module to display first current location information and situation information of the help-seeking device.

7. The emergency rescue system as recited in claim 1, wherein first identification information and second identification information comprise an internet protocol address, a media access control address, a physical address or a phone number.

8. The emergency rescue system as recited in claim 1, wherein the help-seeking device and the rescue device respectively comprise a communication module to provide the help-seeking device and the rescue device, which have been paired, to perform audio or video communication.

9. The emergency rescue system as recited in claim 1, wherein the server further stores the help-seeking message and the positioning message.

10. A help-seeking device having first identification information suitable for use in an emergency rescue system, the help-seeking device comprising:
   a positioning module for positioning a current location of the help-seeking device to generate first current location information;
   an input module for providing a help-seeker to input situation information;
   a processing module connected to the positioning module and the input module to package first identification information, first current location information and situation information into a help-seeking message; and
   a transmission module, connected to the processing module, for sending the help-seeking message to a server to allow the server performing a supply-demand pairing such that the help-seeking message is sent to at least one rescue device near first current location information and a positioning message including second current location information and second identification of the at least one rescue device is sent to the help-seeking device, then the help-seeking device being connected to the at least one rescue device through the first identification information and the second identification of the at least one rescue device for communicating with each other, and obtaining current location of the rescue device through the second current location information.

11. The help-seeking device as recited in claim 10, further comprising a display module connected to the processing module to display the current location of the at least one rescue device.

12. The help-seeking device as recited in claim 10, further comprising an image capturing module connected to the processing module to provide a user to capture images of an ambient condition or self-condition, wherein the help-seeking message is sent to the server through the transmission module after packaging the images into the help-seeking message through the processing module.

13. The help-seeking device as recited in claim 10, further comprising a sensing module connected to the processing module to sense a temperature, humidity or a foregoing combination of an ambient condition, thereby generating a sensing signal, wherein after the processing module computes and process the sensing signal to become ambient information, the ambient information is packaged into the help-seeking message that is further transmitted to the server through the transmission module.

14. The help-seeking device as recited in claim 10, further comprising a communication module connected to the processing module to provide the help-seeking device and the at least one rescue device performing audio or video communication.

15. The help-seeking device as recited in claim 10, wherein the input module is further provided to the help-seeker to input a script message, and the script message then is sent to the at least one rescue device through the transmission module.

16. The help-seeking device as recited in claim 10, wherein the at least one rescue device has second identification information and a GPS function to position a current location to generate second current location information, and the at least one rescue device further packages second identification information and second current location information into a positioning message that then is sent to the server, and the server determines whether or not second current location information is near first current location information, if yes, the supply-demand pairing is executed.

17. An emergency rescue method comprising:
   using a help-seeking device having first identification information and a GPS positioning function to position a current location to generate first current location information and providing a help-seeker to input situation information;
   packaging the first identification information, first current location information and situation information into a help-seeking message through the help-seeking device and sending the help-seeking message;
   using a rescue device having second identification information and a GPS positioning function to position a current location to generate second current location information;
   packaging second identification information and second current location information into a positioning message through the rescue device and sending the positioning message;
   providing a server to receive the help-seeking message and the positioning message to determine whether or not first current location information corresponds to second current location information, if yes, performing a supply-demand pairing;
   sending the help-seeking message to the rescue device through the server and sending the positioning message to the help-seeking device;
   connecting the help-seeking device to the rescue device through first identification information and second identification information for communicating with each other; and
   observing the second current location information of the rescue device at the help-seeking device for enabling the help-seeking device obtaining the current location of the rescue device.

18. The emergency rescue method as recited in claim 17, further comprising a step:
   utilizing the help-seeking device to display second current location information in the rescue device that is paired, and displaying first current location information in the help-seeking device through the rescue device.

19. The emergency rescue method as recited in claim 17, further comprising a step:
   utilizing the help-seeking device to capture images of an ambient condition of the help-seeker and packaging the images into the help-seeking message through a processing module so that the help-seeking message then is transmitted by a transmission module to the server.

20. The emergency rescue method as recited in claim 17, further comprising steps:

utilizing the help-seeking device to sense a temperature, humidity or a foregoing combination of an ambient condition around the help-seeking device to generate a sensing signal; and computing and processing the sensing signal to become ambient information through a processing module to package ambient information into the help-seeking message that is further transmitted by a transmission module to the server.

\* \* \* \* \*